US 8,499,149 B2

(12) United States Patent
Chen

(10) Patent No.: US 8,499,149 B2
(45) Date of Patent: Jul. 30, 2013

(54) REVOCATION FOR DIRECT ANONYMOUS ATTESTATION

(75) Inventor: Liqun Chen, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1120 days.

(21) Appl. No.: 12/378,996

(22) Filed: Feb. 19, 2009

(65) Prior Publication Data

US 2009/0210705 A1 Aug. 20, 2009

(30) Foreign Application Priority Data

Feb. 20, 2008 (GB) ................................. 0803053.8
Mar. 10, 2008 (GB) ................................. 0804362.2

(51) Int. Cl.
*H04L 9/16* (2006.01)

(52) U.S. Cl.
USPC .......... 713/158; 713/155; 713/163; 713/168; 713/176; 726/10; 380/30

(58) Field of Classification Search
USPC ...................................................... 713/158
See application file for complete search history.

(56) References Cited

U.S. PATENT DOCUMENTS

| | | | | |
|---|---|---|---|---|
| 5,699,431 A * | 12/1997 | Van Oorschot et al. | ........ | 380/30 |
| 5,748,763 A * | 5/1998 | Rhoads | .......................... | 382/115 |
| 5,864,667 A * | 1/1999 | Barkan | ........................... | 726/10 |
| 7,814,326 B2 | 10/2010 | Gentry | | |
| 7,844,614 B2 * | 11/2010 | Brickell et al. | ............... | 707/756 |
| 8,078,876 B2 * | 12/2011 | Brickell et al. | ............... | 713/176 |
| 2002/0133701 A1 * | 9/2002 | Lotspiech et al. | ............ | 713/163 |
| 2002/0147906 A1 * | 10/2002 | Lotspiech et al. | ............ | 713/158 |
| 2003/0177352 A1 * | 9/2003 | Camenisch et al. | .......... | 713/158 |
| 2005/0022102 A1 | 1/2005 | Gentry | | |
| 2005/0268103 A1 | 12/2005 | Camenisch | | |
| 2006/0010079 A1 * | 1/2006 | Brickell | ......................... | 705/67 |
| 2006/0085637 A1 * | 4/2006 | Pinkas | .......................... | 713/168 |
| 2007/0101138 A1 | 5/2007 | Camenisch | | |
| 2007/0244833 A1 | 10/2007 | Camenisch | | |
| 2007/0245138 A1 | 10/2007 | Camenisch | | |
| 2008/0020786 A1 | 1/2008 | Smith et al. | | |
| 2008/0133926 A1 | 6/2008 | Gentry | | |

(Continued)

FOREIGN PATENT DOCUMENTS

GB        2419 262 A    4/2006
WO    WO-2004/104797   12/2004

OTHER PUBLICATIONS

Barreto, P. et al., "Efficient algorithms for pairing-based cryptosystems" Advances in Cryptology l CRYPTO '02, vol. 2442 of LNCS, pp. 354-358. Springer 2002.

(Continued)

*Primary Examiner* — Kambiz Zand
*Assistant Examiner* — Yonas Bayou

(57) ABSTRACT

Direct Anonymous Attestation involves a Signer using a credential supplied by an Issuer to anonymously prove to a Verifier, on the basis of a public key of the Issuer, the Issuer's attestation to the Signer's membership of a particular group. To facilitate membership revocation, the Issuer updates the public key at intervals, and also effects a complementary updating to the Signer's credential unless the Signer has ceased to be a legitimate group member. A non-updated credential is inadequate to enable the Signer to prove its Issuer attested group membership to a Verifier on the basis of the updated Issuer public key.

15 Claims, 2 Drawing Sheets

U.S. PATENT DOCUMENTS

| | | | |
|---|---|---|---|
| 2008/0178005 A1 | 7/2008 | Gentry | |
| 2008/0270786 A1* | 10/2008 | Brickell et al. | 713/155 |
| 2008/0270790 A1* | 10/2008 | Brickell et al. | 713/158 |
| 2008/0276084 A1 | 11/2008 | Camenisch | |
| 2008/0307223 A1* | 12/2008 | Brickell et al. | 713/158 |
| 2008/0313465 A1 | 12/2008 | Gentry | |
| 2009/0049300 A1 | 2/2009 | Camenisch | |
| 2009/0129600 A1 | 5/2009 | Brickell et al. | |
| 2009/0210705 A1 | 8/2009 | Chen | |
| 2009/0210716 A1* | 8/2009 | Chen | 713/176 |
| 2009/0271618 A1 | 10/2009 | Camenisch et al. | |
| 2010/0082973 A1 | 4/2010 | Brickell et al. | |

OTHER PUBLICATIONS

Boneh, D. et al., "Identity-based encryption from the Weil pairing", Advances in Cryptology ; CRYPTO '01, vol. 2139 of LNCS, pp. 213-229, Springer, 2001.

Brickell, E. et al., "Direct anonymous attestation", Proceedings of the 11th ACM Conference on Computer and Communications Security, pp. 132-145. ACM Press, 2004.

Brickell, E. et al., "A New Direct Anonymous Attestation Scheme from Bilinear Maps", Proceedings of Trust 2008, Villach/Austria, Mar. 2008.

Brickell, E. et al., "Enhanced Privacy ID: A Direct Anonymous Attestation Scheme with Enhanced Revocation Capabilities" 6th Workshop on Privacy in Electronic Soc., Oct. 2007.

Camenisch, J. et al. "Efficient group signature schemes for large groups" In Advances in Cryptology—CRYPTO '97, vol. 1296 of LNCS, pp. 410-424. Springer, 1997.

Camenisch, J. et al., "Signature schemes and anonymous credentials from bilinear maps", Advances in Cryptology, CRYPTO '04, vol. 3152 of LNCS, pp. 56-72. Springer, 2004.

Fiat, A. et al., "How to prove yourself: Practical solutions to identification and signature problems" Adv in Cryptology,CRYPTO '86, V. 263 of LNCS, pp. 186-194. Springer 1987.

Galbraith, S. et al., "Implementing the Tate pairing" Proc. of the 5th Int'l Symposium on Algorithmic Number Theory, pp. 324-337, London, UK, Springer 2002.

Brickell, E., et al., "A New Direct Anonymous Attestation Scheme from Bilinear Maps", Proc. of Trust 2008, LNCS 4968, pp. 166-178, Springer-Verlage Berlin Heidelberg 2008.

Camenisch, J. et al., "An Efficient System for Non-transferable Anonymous Credentials with Optional Anonymity Revocation*", Adv in Cryptology, EUROCRYPT 2001, V. 2045, LCNS, p. 93-118, Springer 2001.

Office Action dated Dec. 30, 2011, U.S. Appl. No. 12/322,368, filed Jan. 30, 2009.

TCG TPM Specification 1.2, available at <http://www.trustedcomputinggroup.org>. pp. 170-177, TCG Published, Copyright 2003-2006.

* cited by examiner

REVOCATION FOR DIRECT ANONYMOUS ATTESTATION

FIELD OF THE INVENTION

The present invention relates to effecting revocation in methods and systems that implement Direct Anonymous Attestation (DAA). DAA is a cryptographic mechanism that enables remote authentication of a user while preserving privacy under the user's control. Revocation means to terminate a previously-legitimate user's privilege to a system, when the user does not suit the system any more.

The specific DAA scheme set out in detail herein also forms the subject of our co-pending U.S. patent application Ser. No. 12/322,368, now U.S. Pat. No. 8,225,098, which is hereby incorporated by reference in its entirety.

BACKGROUND OF THE INVENTION

As DAA scheme involves three types of entities: a DAA issuer, DAA signer, and DAA verifiers (herein respectively, Issuer, Signer, and Verifier). The Issuer is in charge of verifying the legitimacy of Signers to become members of a particular group (typically, all group members will possess a particular characteristic) and of issuing a membership credential, in the form of a signature of a Signer DAA secret, to each legitimate Signer to serve as an Issuer attestation of the Signer's group membership. A Signer can then prove its group membership to a Verifier by signing its membership credential to form a 'DAA signature'. The Verifier can verify the Signer's membership credential from this DAA signature but he cannot learn the identity of the Signer.

The original DAA scheme, (described in the paper: "Direct anonymous attestation" E. Brickell, J. Camenisch, and L. Chen; *Proceedings of the 11$^{th}$ ACM Conference on Computer and Communications Security*, pages 132-145. ACM Press, 2004 and herein incorporated by reference in its entirety) employs the Camenisch-Lysyanskaya signature scheme under the strong RSA assumption. The original DAA scheme also uses the Fiat-Shamir heuristic to turn knowledge proofs into signatures; this heuristic is described in the paper "How to prove yourself: Practical solutions to identification and signature problems" by A. Fiat and A. Shamir.—*Advances in Cryptology; CRYPTO '86*, volume 263 of LNCS, pages 186-194. Springer, 1987.

Although the original DAA scheme was devised for implementation by a Trusted Platform Module ('TPM'—an on-board hardware security component with limited storage space and communication capability that is intended to provide roots of trust for a host computing platform) with Signer computation shared between the TPM and host, this scheme and other DAA schemes can be applied in many situations and are not limited to situations where the Signer's role is divided between two entities.

A form of DAA scheme based on bilinear maps has recently been proposed and is described in the paper "A New Direct Anonymous Attestation Scheme from Bilinear Maps" Ernie Brickell, Liqun Chen and Jiangtao Li; Proceedings of Trust 2008, Villach/Austria, March 2008. This bilinear-map DAA scheme uses the Camenisch-Lysyanskaya signature scheme under the Lysyanskaya, Rivest, Sahai, and Wolf assumption.

As already indicated, the present invention is concerned with effecting revocation in the context of DAA. Of course, if a system, such as one implementing a DAA scheme, possesses the property of user privacy whereby it allows all users to access the system anonymously, efficiently revoking a user is inherently going to be problematic as revocation and anonymity are in conflict with each other.

Currently, there are three types of revocation solution are known for DAA. In the original DAA paper, two solutions were proposed:

In the first solution, revocation is consequent upon a Signer's DAA secret becoming known; anybody believing they have come into possession of a Signer's DAA secret (which, of course, should not happen) can check if this is truly the case by carrying out a check to verify whether a DAA signature from the Signer was signed using the secret or not—if yes, the signature is rejected as the Signer's DAA secret has clearly been compromised. The problem with this solution is that it only works after a Signer's DAA secret is revealed, but it might never happen.

In the second solution, a Verifier builds his own black list of unwelcome Signers.

In order to find whether a DAA signature was signed by a black-listed Signer, the Verifier must require the Signer to use a specific basename in his DAA signature, which destroys the interesting property of unlinkability.

A third solution has recently proposed by Brickell and Li (see 'Enhanced Privacy ID: A Direct Anonymous Attestation Scheme with Enhanced Revocation Capabilities' 6th Workshop on Privacy in the Electronic Society (WPES), Alexandria, Va., October 2007), In this solution, in each DAA signature, a Signer is required to prove, in a zero-knowledge proof manner, that his private signing key is not listed in a black list maintained by a revocation manager. However, if the black list is quite large, which may well be the case, each DAA signature will be unduly large and complicated.

SUMMARY OF THE INVENTION

According to one aspect of the present invention, there is provided a cryptographic method in which an Issuer, on assessing a Signer as a currently legitimate member of a group associated with a public/private key pair of the Issuer, uses a disguised secret of the Signer and the group-associated private key to generate a credential, in the form of a signature of the Signer's secret, the Signer subsequently signing the credential and providing the signed credential to a Verifier to prove, on the basis of the group-associated public key, Issuer attestation of the Signer's group membership without the identity of the Signer being revealed; the method comprising the Issuer, acting at intervals through Issuer computing apparatus:

updating at least the public key of the public/private key pair associated with the group, and effecting a complementary updating to the Signer's credential to take account of the updating of the group-associated key pair unless the Signer has ceased to be a legitimate group member;

a non-updated credential being inadequate to enable the Signer to prove its Issuer attested group membership to a Verifier on the basis of the updated Issuer public key.

Other aspects of the invention are set out in the appended claims.

BRIEF DESCRIPTION OF THE DRAWINGS

Embodiments of the invention will now be described, by way of non-limiting example, with reference to the accompanying diagrammatic drawings of embodiments of the invention, in which.

BEST MODE OF CARRYING OUT THE INVENTION

Figure 1:
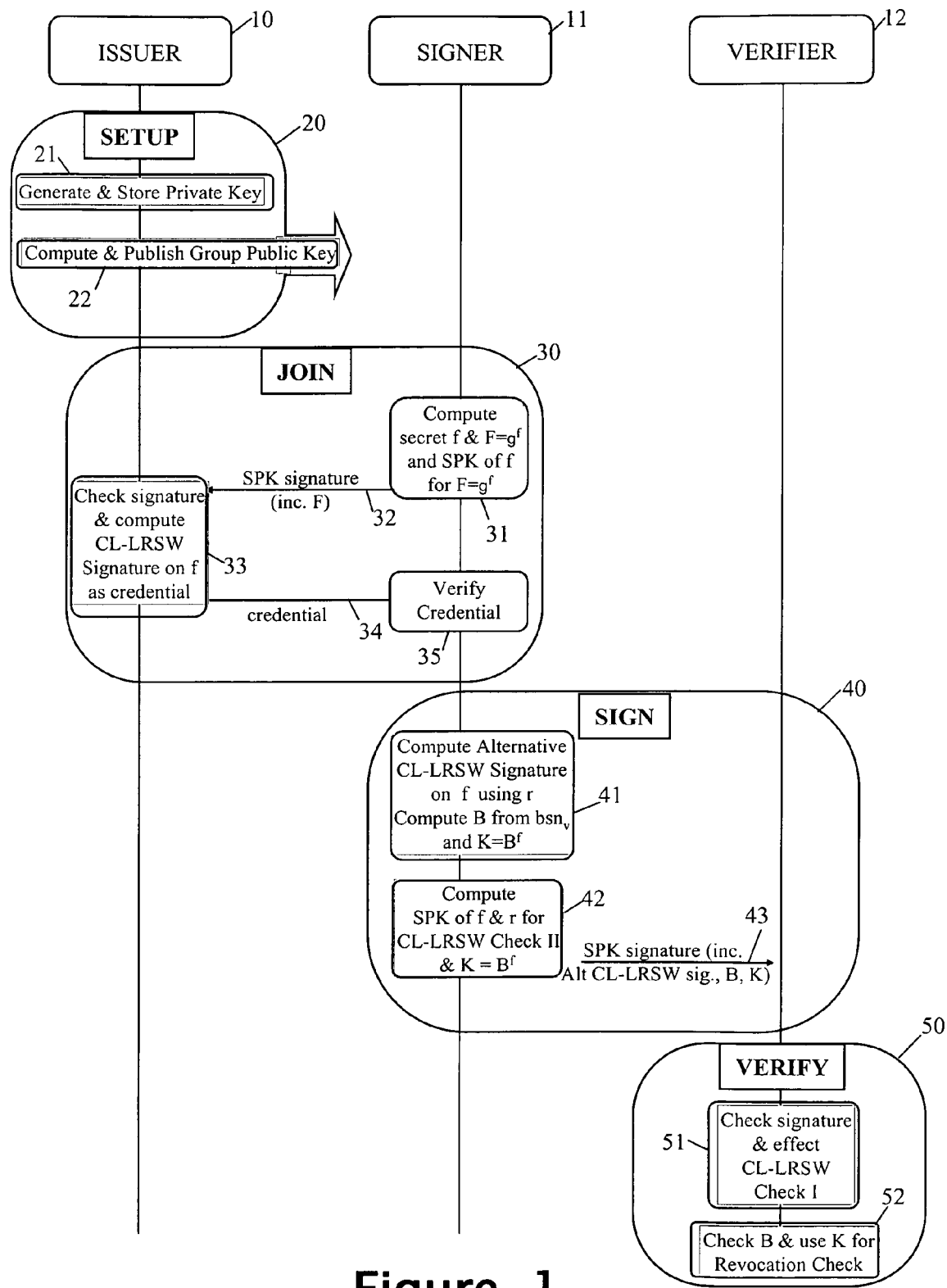
FIG. 1 is a diagram giving an overview of the main operations of Setup, Join, Sign and Verify phases of a DAA method based on bilinear maps.

Embodiments of the invention are described below both for the original DAA scheme set out in the paper by Brickell, Camenisch Chen referenced above, and for the bilinear-map based DAA scheme described in above-mentioned paper by Brickell, Li, and Chen.

In order to facilitate an understanding of the invention, a detailed description will be first be given of an existing DAA scheme which employs a known revocation solution; the enhanced bilinear-map based DAA scheme has been chosen for this purpose as it is most simply explained. Some details will first be given of various underlying techniques and principles that are utilized by the enhanced bilinear-map based DAA scheme.

Bilinear Maps

As indicated above, the example DAA scheme to be described below make use of a bilinear map $e: G \times G \to \mathbb{G}$, where G and $\mathbb{G}$ denotes two groups of prime order q. The map e satisfies the following properties:

1. Bilinear. For all $P, Q \in G$, and for all $a, b \in Z_q$, $e(P^a, Q^b) = e(P,Q)^{ab}$.
2. Non-degenerate. There exists some $P, Q \in G$ such that $e(P,Q)$ is not the identity of $\mathbb{G}$.
3. Computable. There exists an efficient algorithm for computing $e(P,Q)$ for any $P, Q \in G$.

A bilinear map satisfying the above properties is said to be an admissible bilinear map. Such a bilinear map is also known as the symmetric pairing. In general, one can consider bilinear maps $e: G_1 \times G_2 \in \mathbb{G}$ where $G_1, G_2, \mathbb{G}$ are cyclic groups of prime order q. Such a bilinear map is known as the asymmetric pairing (the symmetric pairing is the special case of $G_1 = G_2$).

The following papers, hereby incorporated by reference, give further information on bilinear maps and how to construct an admissible bilinear map from the Tate pairing:

- P. S. L. M. Barreto, H. Y. Kim, B. Lynn, and M. Scott. "Efficient algorithms for pairing-based cryptosystems" Advances in Cryptology |CRYPTO '02, volume 2442 of LNCS, pages 354-368. Springer, 2002.
- S. D. Galbraith, K. Harrison, and D. Soldera. "Implementing the Tate pairing" Proceedings of the 5th International Symposium on Algorithmic Number Theory, pages 324-337, London, UK, 2002. Springer.

Admissible bilinear maps can also be constructed from the Weil pairing. Details can be found in the paper "Identity-based encryption from the Weil pairing", D. Boneh and M. Franklin; Advances in Cryptology; CRYPTO '01, volume 2139 of LNCS, pages 213-229, Springer, 2001. Existing implementations of the Tate pairing are, however, more efficient than the existing implementations of the Weil pairing.

By way of example, an admissible bilinear map useable in the DAA scheme described below can be formed from the Tate pairing as follows:

Let p be a prime satisfying $p = 3 \mod 4$ and let q be some prime factor of $p+1$.

Let E be the elliptic curve defined by the equation $y^2 = x^3 - 3x$ over $F_p$. $E(F_p)$ is supersingular and contains $p+1$ points and $E(F_{p^2})$ contains $(p+1)^2$ points.

Let $g \in E(F_p)$ to a point of order q and let G be the subgroup of points generated by g.

Let $\mathbb{G}$ be the subgroup of $F^*_{p^2}$ of order q.

Let $\phi(x; y) = (-x; iy)$ be an automorphism of the group of points on the curve $E(F_p)$, where $i^2 = 1$. Then $\phi$ maps points of $E(F_p)$ to points of $E(F_{p^2}) | E(F_p)$.

Let f be the Tate pairing, then it is possible to define e: $G \times G \to \mathbb{G}$ as:

$$e(P;Q) = f(P; \phi(Q)),$$

where e is an admissible bilinear map.

Protocols for Proof of Knowledge

In the following, various protocols to prove knowledge of and relations among discrete logarithms are used. The notation used to describe these protocols is that introduced by Camenisch and Stadler [J. Camenisch and M. Stadler. "Efficient group signature schemes for large groups" In *Advances in Cryptology—CRYPTO '97*, volume 1296 of *LNCS*, pages 410-424. Springer, 1997] for various proofs of knowledge of discrete logarithms and proofs of the validity of statements about discrete logarithms. For example:

$$PK\{(a;b): y_1 = (g_1)^a (h_1)^b \land y_2 = (g_2)^a (h_2)^b\}$$

denotes a proof of knowledge of integers a and b such that $y_1 = (g_1)^a (h_1)^b$ and $y_2 = (g_2)^a (h_2)^b$, where $y_1; g_1; h_1; y_2; g_2; h_2$ are elements of some groups $G_1 = (g_1) = (h_1)$ and $G_2 = (g_2) = (h_2)$ and all parameters other than a and b are known to the verifier. Using this notation, a proof of knowledge protocol can be simply described.

In the random oracle model, such proof of knowledge protocols can be turned into signature schemes using the Fiat-Shamir heuristic (see paper referenced above); a signature on a message m obtained in this way is denoted hereinafter as:

$$SPK\{(a): y = z^a\}(m).$$

Put generally, a signature proof of knowledge (SPK) is a cryptographic primitive which makes use of a special digital signature on a given message to prove possession of some secret knowledge by the signer.

Camenisch-Lysyanskaya (CL-LRSW) Signature Scheme

The DAA methods set out hereinafter uses the Camenisch-Lysyanskaya (CL-LRSW) signature scheme under the Lysyanskaya, Rivest, Sahai, and Wolf (LRSW) assumption (see the paper "Signature schemes and anonymous credentials from bilinear maps", J. Camenisch and A. Lysyanskaya; *Advances in Cryptology, CRYPTO '04*, volume 3152 of *LNCS*, pages 56-72. Springer, 2004). Unlike most signature schemes, the CL-LRSW signature scheme uses bilinear maps and allows for efficient protocols to prove knowledge of a signature and to obtain a signature on a secret message based on proofs of knowledge.

The CL-LRSW signature scheme can be summarized as follows:

Key Generation.

Two groups $G = (g)$ and $\mathbb{G} = (g)$ of prime order q are chosen and an admissible bilinear map e between G and $\mathbb{G}$. Next choose $x \leftarrow Z_q$ and $y \leftarrow Z_q$, and set the public key as $(q, 9, G, g, \mathbb{G}, e, X, Y)$ and the secret key as $(x, y)$, where $X = g^x$ and $Y = g^y$. For simplicity, in the present description, the exponentiation operation $h^a$ for $h \in G$ and an integer a outputs an element in G.

Signature.

On input message m, the secret key $(x, y)$, and the public key $(q, g, G, g, \mathbb{G}, e, X, Y)$, choose a random $a \in G$, and output the signature $\sigma = (a, a^y, a^{x+mxy})$.

Verification.

On input the public key (q, g, G, g, G, e, X, Y), the message m, and the signature σ=(a, b, c) on m, check whether the following equations hold $e(Y,a)\stackrel{?}{=}e(g,b)$, (herein "CL-LRSW Check I")

$e(X,a) \cdot e(X,b)^m \stackrel{?}{=} e(g,c)$ (herein "CL-LRSW Check II")

Observe that from a signature σ=(a, b, c) on a message m, it is easy to compute a different signature σ'=(a', b', c') on the same message m without the knowledge of the secret key; this is done simply by choosing a random number r∈$Z_q$ and computing a':=$a^r$, b':=$b^r$, c':=$c^r$. A signature formed in this way by exponentiation of the components of an original CL-LRSW signature using a random exponent, is referred to herein as an Alternative CL-LRSW signature; the term is also used where the exponentiation of the original CL-LRSW signature components is more complex (see below) while still enabling the application of the CL-LRSW Checks I & II.

Overview of the Enhanced Bilinear-Map Based DAA System

FIG. 1 depicts interactions between the entities that participate in the enhanced bilinear-map based DAA system now to be described. More particularly, the system comprises a first computing apparatus 10 associated with an Issuer; at least one second computing apparatus 11 associated with a Signer; and at least one third computing apparatus 12 associated with a Verifier. The computing apparatus 10, 11 and 12 are typically based around general-purpose processors executing stored programs but may include dedicated cryptographic hardware modules. The computing apparatus 10, 11 and 12 inter-communicate as needed via, for example, the internet or other network, though it is also possible that at least some of the entities actually reside on the same computing platform.

In a primary application, the Signer computing apparatus 11 is a host computer ("Host") with a built-in trusted platform module ("TPM") which can be implemented either in hardware or in software. However, for the purposes of the present overview, the Signer computing entity 11 will be treated as unitary.

In general terms, the Issuer is responsible for providing attestation that an approved Signer is a legitimate member of a particular group (and therefore possesses a particular characteristic); the Issuer does this by providing an approved Signer (characterized by a secret f) with a credential in the form of a CL-LRSW signature on f (f being kept secret by the Signer and only provided in disguised form to the Issuer as a Signer-secret dependent quantity F=$g^f$). The Signer then uses an Alternative form of the CL-LRSW signature credential (derived using a random exponent r) to prove to a Verifier that the Signer has been approved by the Issuer, this process involving a signature proof of knowledge (SPK) by the Signer of f and r. Furthermore, in order to enable a particular Verifier to link together its interactions with a particular Signer, the Signer may generate a quantity B from a basename value $bsn_v$ of the Verifier, as well as a further quantity K=$B^f$, and then provide both B and K to the Verifier; the value of K then enables linkability by the Verifier for the particular Signer concerned. K can also be used to check for revocation of the Signer's credential.

In more detail, the DAA method illustrated in FIG. 1 comprises four phases, namely: Setup 20, Join 30, Sign 40 and Verify 50.

During the Setup phase 20, the Issuer generates and stores a private key (step 21), and establishes system parameters which it publishes in a complementary public key (step 22). The public/private key pair is associated with the group for which the Issuer is to provide membership attestation—if the Issuer has attestation responsibility for more than one group, then the Issuer generates a respective key pair for each group (for simplicity, in the following, only one group and associated key pair will be considered).

During the Join phase 30, in a step 31, the Signer generates its secret f and the derivative Signer-secret dependent quantity F=$g^f$ where g is a system parameter; the Signer also generates a signature proof of knowledge (SPK) of f for F=$g^f$. The Signer then sends the SPK signature (including F) to the Issuer (arrow 32). In step 33, the Issuer checks the SPK signature to confirm the Signer's knowledge of f, and then computes a CL-LRSW signature on f as the Signer's credential (assuming that the Issuer is willing to grant group membership to the Signer). This CL-LRSW signature credential is then passed to the Signer (arrow 34) which stores it as a secret after, optionally, verifying the credential (step 35) by applying the CL-LRSW checks.

During the Sign phase 40, the Signer attests itself to the Verifier by providing an anonymous form of its credential that the Verifier can verify is based on the credential provided by the Issuer for the Signer with secret f. More particularly, in step 41 the Signer computes an Alternative CL-LRSW signature by exponentiating the components of its CL-LRSW signature credential by random value r. The Signer also computes B from the basename value $bsn_v$ of the Verifier and then computes K=$B^f$. In step 42, the Signer computes a signature proof of knowledge (SPK) of f and r for f & r satisfying both the CL-LRSW Check II (see above) and K=$B^f$. The Signer sends the SPK signature, including the Alternative CL-LRSW signature and B & K, to the Verifier (arrow 43).

During the Verify phase 50, in step 51 the Verifier checks the received SPK signature to confirm Signer's knowledge of f and r. The Verifier also checks that the received Alternative CL-LRSW signature is a valid CL-LRSW signature on f—as the CL-LRSW Check II has been effectively included in the check on the SPK signature (the values of f and r being ones that satisfy Check II), the Verifier need only further effect CL-LRSW Check I. In step 52 the Verifier checks that the received value of B is correctly based on the Verifier's basename value $bsn_v$, thereby confirming that the received value of K is in respect of itself and the Signer characterized by f (because the SPK signature was bound to a value of f satisfying K=$B^f$). The Verifier then checks K against a rogue list of values of K that correspond to revoked credentials.

It will be appreciated that the foregoing is only an overview and does not include certain details such as the messages on which the SPK signatures are formed. It should also be noted that not all elements of the FIG. 1 DAA method are essential; for example, in the Join phase, the Signer can prove its knowledge of f by means other than a signature proof of knowledge, such as by using a short signature scheme. The generation of the quantities B and K using the basename value $bsn_v$ of a Verifier to enable linkability by the Verifier, may also not be needed in certain applications; however, in the full description given below of the enhanced bilinear-map based DAA system, even where linkability is not required, B and K are still generated (but with B being created as a random element in G) as these quantities are needed for implementing the known revocation solution to be described.

Detailed Description of Enhanced Bilinear-Map Based DAA System

The following description is given for a unitary Signer for reasons of clarity, it being understood that it is also possible to split the operations effected by the Signer between a Signer TPM and Host.

Setup

Let $1_q$, $1_H$ and $1_\phi$ be three security parameters, where $1_q$ is the size of the order q of the groups and $1_H$ is the output length of the hash function used for Fiat-Shamir heuristic, and $1_\phi$ is the security parameter controlling the statistical zero-knowledge property.

The Issuer, who has attestation responsibility for a given group, chooses two groups G=(g) and G̃=(g̃) of prime order q and an admissible bilinear map e between G and G̃, i.e., e: G×G→G̃ (it will, of course, be appreciated that the use of the word 'group' in relation to G and G̃ is in the mathematical sense and such usage is not to be confused with the less formal usage of 'group' earlier in the sentence regarding the group whose membership is to be attested to). The Issuer then chooses $x \leftarrow Z_q$ and $y \leftarrow Z_q$ uniformly at random, and computes $X := g^x$ and $Y := g^y$. The Issuer sets the public key associated with the membership group, the group public key, as (q, g, G, g̃, G̃, e, X, Y) and its corresponding private key as (x, y) and publishes the group public key. Note that the correctness of the group public key can be verified by checking whether each element is in the right group.

Let H(*) and $H_G$(*) be two collision resistant hash functions such that:

$$H: \{0, 1\}^* \to \{0, 1\}^{l_H}$$

$$H_G: \{0, 1\}^* \to G.$$

(One way of constructing $H_G$ is use a collision resistant hash function $H_2(w)$ which maps the value w to an element in $F_{p^2}$; to compute $H_G(w)$, compute $H_2(w)^{(p2-1)/q}$. Other ways of constructing $H_G$ will be apparent to persons skilled in the art).

Join

It is assumed that the Signer and the Issuer have established a one-way authentic channel, i.e., the Issuer is sure that it is talking to the right Signer.

With (q, g, G, g̃, G̃, e, X, Y) be the group public key, $K_I$ a long-term public key of the Issuer, and 'DAAseed' a seed for computing the secret key of the Signer.

The Join protocol comprises the following steps:
1. The Signer computes $$f := H(DAAseed \| K_I) \bmod q, \; F := g^f,$$

where $\|$ represents the operation of concatenation.

2. The Signer proves its knowledge of f to the Issuer by computing the signature of knowledge:

$$SPK\{(f): F = g^f\}(n_I \| n_T)$$

as follows:
(a) The Signer chooses a random $r_f \leftarrow Z_q$ and computes $T := g^{r_f}$.
(b) The Issuer chooses a nonce $n_I \in \{0, 1\}^{l_H}$ and sends $n_I$ to the Signer.
(c) The Signer chooses a nonce $n_T \in \{0, 1\}^{l_\phi}$ and computes $$c := H(q \| g \| g̃ \| A \| Y \| F \| T \| n_I \| n_T).$$

$$s_f := r_f + c \cdot f \bmod q.$$

(d) The Signer sets f as its private key and sends the SPK signature (F, c, $s_f$, $n_T$) to the Issuer.

3. The Issuer checks its records and policy to find out whether the value F should be rejected or not. If F belongs to a rogue Signer or does not pass the Issuer's policy check, e.g. having been required for a credential too many times, the Issuer aborts the protocol.

4. Assuming the check in (3) is passed, the Issuer computes $$\tilde{T} := g^{s_f} F^{-c} \text{ and verifies that:}$$

$$c \stackrel{?}{=} H(q \| g \| g̃ \| X \| Y \| F \| \tilde{T} \| n_I \| n_T).$$

If this check fails, the Issuer aborts the protocol.

5. Assuming the check in (4) is passed, the Issuer now chooses $r \leftarrow Z_q$, and computes:

$$a := g^r, \; b := a^y, \; c := a^x F^{rxy}.$$

Note that $c = a^x g^{frxy} = a^{x+fxy}$ and that (a, b, c) is therefore a CL-LRSW signature on f. The issuer sets this CL-LRSW signature (a, b, c) to be the credential for the Signer and sends (a, b, c) to the Signer.

8. The Signer may optionally wish to verify that (a, b, c) is an CL-LRSW signature on f; if so the Signer carries out the CL-LRSW Checks I and II in respect of signature (a, b, c) and f.

Sign (Note that the quantities r, $r_f$, $S_f$, $n_T$, and c are newly generated in Sign and their values are not carried over from Join).

The Signer has a membership private key (f, a, b, c). Let m be the input message the Signer wants to sign (as in the original DAA scheme, m is preferably presented as b$\|$m' where b=0 means that the message m' is generated by the Signer and b=1 means that m' was input to the Signer). Further, let $bsn_v$ be a basename value provided by the Verifier, and $n_v \in \{0, 1\}^{l_H}$ be a nonce chosen by the Verifier. The signing algorithm involves the following steps:

1. Depending on the Verifier's request (i.e., whether $bsn_v = \bot$ or not), the Signer computes B as follows $$B \leftarrow^R G \text{ or } B := H_G(1 \| bsn_v).$$

where $B \leftarrow^R G$ means that B is chosen from G uniformly at random.

The Signer then computes:

$$K := B^f.$$

2. The Signer chooses random r, $r' \leftarrow Z_q$ and computes $$a' := a^{r'}, \; b' := b^{r'}, \; c' := c^{r'r^{-1}}$$

The triple (a', b', c') constitutes an Alternative CL-LRSW signature on f based on the CL-LRSW signature (a, b, c), notwithstanding that c has been raised to the power ($r'r^{-1}$) rather than r' as a and b (this variation does not affect CL-LRSW Check I and can be compensated for in CL-LRSW Check II by introducing r into the right-hand side of the Check). The reason to raise c to the power ($r'r^{-1}$) rather than r' is to prevent the Issuer being able to identify Alternative signature forms of its CL-LRSW signature (a, b, c) on f, thereby eliminating the possibility of linkability by the Issuer.

3. The Signer computes $$v_x := e(X, a'), \; v_{xy} := e(X, b'), \; v_s := e(g, c').$$

As an alternative to the approach set out in (2) and (3) above, the Signer can carry out a one time computation:

$$A := e(X, a) \; B := e(X, b), \; C := e(g, c),$$

and store (A, B, C) for reuse; thereafter, whenever the Signer needs to carry out the Sign phase, the Signer simply replaces (2) and (3) above by computing:

$$v_x := A^{r'}, \; v_{xy} := B^{r'}, \; v_s := C^{r'r^{-1}}.$$

4. The Signer computes a "signature of knowledge"

$$SPK\{(r, f): (v_s)^r = v_x (v_{xy})^f \wedge K = B^f\}(n_v \| n_T \| m)$$

Note that verification of this signature verifies $(v_s)^r = v_x (v_{xy})^f$ which is the CL-LRSW Check II for the CL-LRSW signature (a', b', c') on f.

This signature of knowledge is computed as follows:
(a) The Signer chooses two random integers $r_r, r_f \in Z_q$ and computes $$T_1 := (v_s)^{r_r} (v_{xy})^{-r_f}, \; T_2 := B^{r_f}.$$

(b) The Signer chooses a nonce $n_T \in \{0, 1\}^{l_\phi}$ computes $$c := H(q\|g\|g\|X\|Y\|a'\|b'\|c'\|v_x\|v_{xy}\|v_s\|B\|K\|T_1\|T_2\|m\|n_T\|n_V)$$

(c) The Signer computes $$s_r := r_r + c \cdot r \bmod q, \; s_f := r_f + c \cdot f \bmod q$$

5. The Signer outputs the signature $\sigma = (B, K, a', b', c', c, s_r, s_f, n_T)$.

Verify

To verify candidate signature $\sigma = (B, K, a', b', c', c, s_r, s_f, n_T)$ on a message formed from m and the two nonces $n_V$ and $n_T$, the Verifier, given the group public key (q, g, G, g, G, e, X, Y) proceeds as follows:

1. If $bsn_V \neq \perp$, the Verifier verifies that $B ?= H_G(1\|bsn_V)$, otherwise, the Verifier verifies that $B \in G$.
2. For each $f_i$ in the rogue list, the Verifier checks that $K ?\neq B^{f_i}$. If K matches with any $f_i$ in the rogue list, the Verifier outputs 'reject' and aborts.
3. Assuming the check in (2) is passed, the Verifier checks that $$e(Y, a') ?= e(g, b'), K ?\in G.$$

The first of these checks corresponds to the CL-LRSW Check I for the signature (a', b', c') on f.

4. The Verifier computes $$v_x := e(X, a'), \; v_{xy} := e(X, b'), \; v_s := e(g, c').$$

$$T_1 := (v_s)^{s_r} (v_{xy})^{-s_f} (v_x)^{-c}, \; T_2 := B^{s_f} K^{-c}.$$

5. The Verifier checks that
$c ?= H$
$(q\|g\|g\|X\|Y\|a'\|b'\|c'\|v_x\|v_{xy}\|v_s\|B\|K\|T_1\|T_2\|m\|n_T\|n_V)$.

6. If all the above checks succeed, the Verifier outputs 'accept', otherwise the Verifier outputs 'reject'.

In the above described bilinear-map based DAA scheme, it will be apparent that if the Verifier possesses a quantity which he believes is the Signer's DAA secret f (because it has been comprised in some way), then it is a simply matter for the Verifier to check whether the quantities B and K in the Signer's SPK are related as $K ?= B^f$ and, if so, to treat f as compromised; this is carried out in step 2 of the Verify phase.

Revocation Methods According to Embodiments of the Invention

It will be apparent from the foregoing, that a DAA Issuer creates each Signer credential by using the Issuer's private key and, indirectly, a secret of the Signer concerned (the Issuer's private key and the Signer's secret being respectively (x, y) and f in the above-described bilinear-map based DAA scheme).

In revocation methods embodying the present invention, the Issuer updates his private and public keys at intervals, preferably regular; at each update of his keys the Issuer also correspondingly updates each DAA credential it holds unless, from the Issuer's knowledge, a Signer is no longer a legitimate group member in which case the Issuer refuses to update the credential concerned. Credential updating requires the Issuer to have stored, during the initial Join phase executed with the relevant Signer, one or more Signer-specific quantities used or generated by the Issuer during its Join-phase computations. The Issuer publishes his updated public key and makes each updated DAA credential available to the corresponding Signer. Subsequent Sign phase signings by a Signer are effected on the basis of the Signer's updated credential and subsequent Verify phase verifications by the Verifier are effected using the updated public key of the Issuer; if a Signer's DAA credential has not been updated in correspondence with the updating of the Issuer's public key, verification of the Signer's DAA signature by the Verifier will fail thereby giving effect to revocation of the Signer's group membership.

Details of how the Issuers private key and a Signer's DAA credential are updated by the Issuer will now be given both for the original RSA based DAA scheme and for the above-described bilinear-map based DAA scheme, starting with the latter.

Effecting Updating in the Bilinear-Map Based DAA Scheme

In this DAA scheme, the Issuer's private key is (x, y) and its public key includes (g, $X=g^x$, $Y=g^y$); the Signer's secret is f, $F=g^f$, and the corresponding DAA credential is (a, $b=a^y$, $c=a^{(x+xyf)}$) for a randomly generated a.

Figure 2:
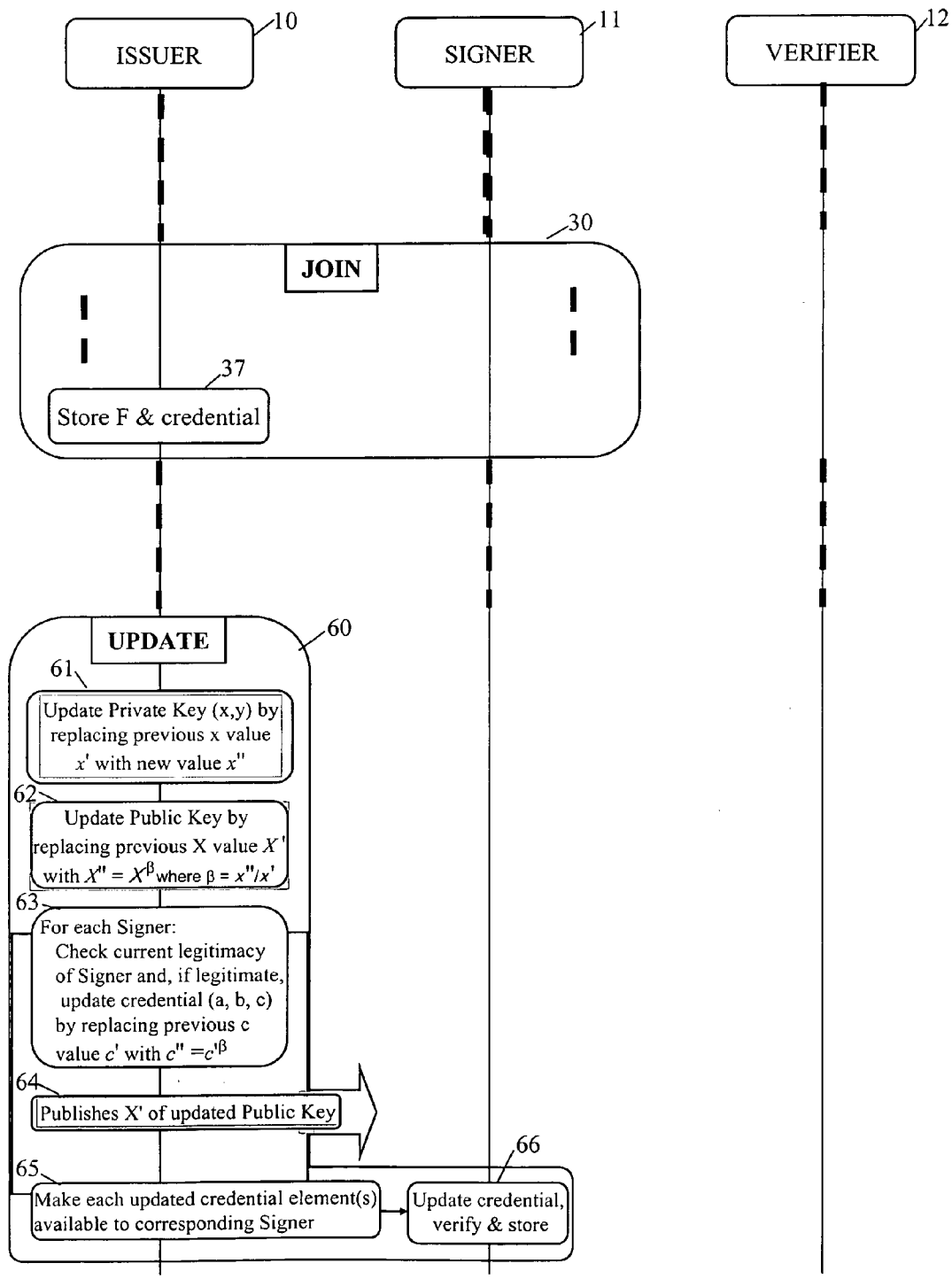
FIG. 2 is a diagram illustrating the general architecture of a DAA revocation method embodying the invention as applied to the DAA method of FIG. 1.

As depicted in FIG. 2, during the Join phase 30 for each Signer, the Issuer stores (step 37) at least element c of the newly-computed credential (a, b, c); typically, the Issuer will store the complete credential and the Signer-secret dependent quantity F. To effect the periodic updating, the Issuer first updates its private key by deriving a new value for x, (here called x''), and replaces the previous value for x (here called x') in its private key with x'' (step 61); the value x'', and a related value β used subsequently in updating the Issuer's public key, can be derived, for example, by randomly choosing x'' and computing β=x''/x', or by randomly choosing β and then computing x''=x'β. The Issuer then updates its public key by replacing the previous value X' of X with the value X''=X'^β (step 62).

In the foregoing, in determining the value of β (where x'' is chosen at random) or x'' (where β is chosen at random), rather than x' being the previous value of x, x' could be the original value of x—the two being different for updates beyond the first).

For each currently legitimate Signer, the Issuer updates the Signer's credential (a, b, c) by replacing the previous value c' of the credential element c with c''=c'^β (step 63). The Issuer then publishes X'' to replace the previous value X' of X in its public key (step 64), and for each updated credential, makes c'' available to the corresponding Signer to enable the Signer to update its copy of the credential by replacing the previous value c' of c with c'' (step 65). The Signer may optionally wish to verify that the updated credential is an CL-LRSW signature on f associated with the Issuer's new public key; if so, the Signer carries out the CL-LRSW Checks I and II in respect of signature (a, b, c=c'') and f.

The updating of the credential element c' to c'', can be effected in a number of different ways, the above being just one possibility. For example, if the random value r generated during the Join phase is stored along with the Signer-secret dependent quantity F and credential element a rather than c, then c'' can be computed as $a^{x''} F^{rx''y}$.

In respect of updating the Issuer's private key, the Issuer can instead of replacing x' with x'', update his private key by replacing the previous value y' of y with a new value y'', or even by updating both x and y; changing the value of x while leaving that of y unchanged is preferred as it is more efficient, since the value of b does not have to be changed. Of course, if the value of y is changed, then the quantity Y of the Issuer' public key must also be updated as well as the element b of the credential of each currently legitimate Signer.

Effecting Updating in the Original RSA Based DAA Scheme

Reference is directed to the above mentioned paper by Brickell, Camenisch, and Chen for details of the RSA-based scheme; the present explanation of how the Issuer's private key and a DAA credential can be updated uses the same notation as in that paper. In the RSA-based DAA scheme, the Issuer's private key is the factorization of a modulus n, and its public key includes ($R_0$, $R_1$, S, Z, n); the Signer's secret is ($f_0$, $f_1$) and the corresponding credential is (e, A, v), such that the equation $A^e(R_0)^{f_0}(R_1)^{f_1}S^v=Z$ holds; the credential is a Camenisch-Lysyanskaya signature on ($f_0$, $f_1$).

During the Join phase for each Signer, the Issuer stores at least: the disguised form of the Signer's secret provided by the Signer to the Issuer (i.e. the Signer-secret dependent quantity $U=(R_0)^{f_0}(R_1)^{f_1}S^{v'}$ mod n), the quantity e, and the quantity $\hat{v}$ or v"; additionally or alternatively to storing U and v" individually, the quantity $US^{v'}$ can be stored. Typically, the Issuer will store $N_I$, $US^{v'}$ and the triple (e, A, v"). To update the Issuer's private key and the DAA credential of each currently-legitimate Signer, the Issuer simply chooses a new value for Z, here called Z", and, for each currently-legitimate Signer computes a new value for A, here called A", as:

$$A'' = \left(\frac{Z''}{US^{v''}}\right)^{1/e} \mod n$$

The Issuer then publishes Z" to replace the value of Z in its previously published public key; the Issuer also publishes a new non-interactive proof that $R_0$, $R_1$, S, Z, g, and h are computed correctly i.e. that g, h∈(g'), S, Z∈(h) and $R_0$, $R_1$∈(S). For each updated credential, the Issuer makes the newly computed value A" available to the corresponding Signer to enable the Signer to update its credential by replacing the previous value of A with A".

Rather than using stored values of e and v" to compute A", it would be possible to generate new values for e and $\hat{v}$ (and then compute a new value for v"); the Issuer would of course need to make the new values of e and v" available to the Signer concerned.

As regards how an updated DAA credential element can be made available to the corresponding Signer, two example ways in which this can be done are given below, it being appreciated that other ways are also possible:
1. A DAA signature is not traceable from the corresponding DAA credential. Even if the credential is published, the DAA scheme can still hold the properties of anonymity, unlinkability and untraceability. As a consequence, it is acceptable for the Issuer to maintain a publicly available list of the current values of all Signer credentials, or at least of those credential elements subject to updating (for example in the RSA-based DAA scheme, the most recently computed values of A are listed and in the bilinear-map based DAA scheme, the most recently computed values of c are listed). Each Signer can download its own value from the list (provided, of course, some appropriate identifier of each list entry is provided such as the related Signer-secret dependent quantity F or U, or the non-updatable credential elements; alternatively the Issuer can create an index, where each Signer has an reference number, which is not linked to its secret or credential but uniquely indicates the Signer—in this case, the Signer may wish to check the message authentication of the published list before downloading the updated value and this can be done by using an ordinary signature scheme).

Although revocation of a Signer need not result in removal of the corresponding entry from the public list maintained by the Issuer (the non-updating of the updatable elements being adequate to effect revocation), it is preferable to remove such entries to minimize the size of the list.

Should the Issuer desire to make updated credential elements available only to their respective Signers, the Issuer can encrypt each updated credential element value under a private key of the Signer concerned (where the Signer is a TPM this key could be the TPM's endorsement key) and then list the ciphertext rather than the plaintext on the public list maintained by the Issuer.
2. The issuer sends each updated credential element value to the corresponding Signer. Again, if the Issuer desires that only the relevant Signer can access this value, the delivery should be via a secure authenticated channel, which can be achieved by encrypting the value under a private key of the Signer concerned (where the Signer is a TPM this key could be the TPM's endorsement key).

Significant advantage of the above-described embodiments of the revocation method of the invention, are that compared with the existing solutions, the above-described embodiments:
do not rely on knowledge of a compromised Signer's secret;
does not require any extra proof or verification in the Sign and Verification phases, and so are more efficient.

It will be appreciated that many variants are possible to the detail of the DAA methods described without thereby affecting the general form of the steps involved in the described embodiments of the invention (albeit some of the computational details may vary). It will also be appreciated that where the revocation method embodying the present invention is implemented for a DAA scheme, then that scheme need not include any of the steps associated with other revocation methods.

The invention claimed is:

1. A cryptographic method in which an Issuer, on assessing a Signer as a currently legitimate member of a group associated with a public/private key pair of the Issuer, uses a disguised secret of the Signer and the group-associated private key to generate a credential, in the form of a signature of the Signer's secret, which the Issuer provides to the Signer as an Issuer attestation of the Signer's group membership, the Signer subsequently keeping the credential as a secret and using a signature proof of knowledge to prove, on the basis of the group-associated public key, its possession of the credential to a Verifier without the identity of the Signer being revealed; the method comprising the Issuer, acting through Issuer computing apparatus, at intervals:
updating at least the public key of the public/private key pair associated with the group, and
effecting a complementary updating to the Signer's credential to take account of the updating of the group-associated key pair unless the Signer has ceased to be a legitimate group member;
a non-updated credential being inadequate to enable the Signer to prove its credential possession to a Verifier on the basis of the updated Issuer public key.

2. A cryptographic method according to claim 1, wherein the method is bilinear-map based with the credential being a Camenisch-Lysyanskaya signature under the Lysyanskaya, Rivest, Sahai, and Wolf assumption, and the signing of the credential by the Signer providing a signature proof of knowledge in respect of at least the Signer's secret.

3. A cryptographic method according to claim 2, wherein the group-associated private key has elements x and y whose values are chosen at random, and the public element includes respective elements dependent on the values of x and y; the updating of the public/private key pair comprising:
updating the private key by one of:
assigning a new random value to x but leaving y unchanged, assigning a new random value to y but leaving x unchanged, assigning respective new random values to both x and y; and updating any element of the public key that is dependent on the value of an updated element of the private key.

4. A cryptographic method according to claim 2, wherein the group-associated private key has elements x and y whose values are chosen at random, the public element includes respective elements dependent on the values of x and y, and the credential is of the form (a,b=$a^y$, c=$a^{x+fxy}$) where 'a' is a value chosen at random, and 'f' is the Signer's secret; updating of the private key being effected by assigning a new random value x" to x but leaving y unchanged, updating of the public key being effected by updating the public-key element X that is dependent on private-key element x to reflect the updated value x" of element x, and updating of the credential being effected by updating an element c only of the credential.

5. A cryptographic method according to claim 4, wherein:
an updated value X" of the public-key element X is computed as:
(the value of X prior to updating)$^\beta$
an updated value c" of the credential element c is computed as:
(the value of c prior to updating)$^\beta$
where $\beta$=x"/(the value of x prior to updating).

6. A cryptographic method according to claim 1, wherein the method is RSA based with the credential being a Camenisch-Lysyanskaya signature under the strong RSA assumption, and the signing of the credential by the Signer providing a signature proof of knowledge in respect of at least the Signer's secret.

7. A cryptographic method according to claim 6, wherein the group-associated public key has random elements $R_0$, $R_1$, S, Z, and modulus n, the credential includes an element A computed by the Issuer as $$A = \left(\frac{Z'}{US^{v''}}\right)^{1/e} \mod n$$

where v " is a random value, e is a prime, and U is the disguised secret of the Signer;

the updating of the public/private key pair comprising assigning a new random value Z" to the public-key element Z, and updating of the credential being effected by computing an updated value for A on the basis of the new value Z" of the public-key element Z.

8. A cryptographic method according to claim 1, wherein said intervals are regular intervals.

9. A cryptographic method according to claim 1, wherein after updating of the credential, the credential is made available to the Signer by being placed in a list of updated credentials maintained by the Issuer.

10. A cryptographic method according to claim 1, wherein the updated credential is placed in said list in encrypted form such as to be decryptable only by the Signer.

11. A cryptographic method according to claim 1, wherein after updating of the credential, the credential is made available to the Signer by being passed by the Issuer to the Signer over a secure authenticated channel.

12. A cryptographic method comprising:
an initial set up phase in which an Issuer, responsible for membership of a group, generates a private key and a corresponding public key;

a join phase in which a Signer generates a secret and provides the secret in disguised form to the Issuer which, on assessing the Signer as a currently legitimate group member, uses the disguised secret and the private key to generate a credential, in the form of a Camenisch-Lysyanskaya signature of the Signer's secret, serving as an Issuer attestation to the Signer's group membership, the credential being returned to the Signer; and sign and verify phases in which the Signer keeps the credential as a secret and uses a signature proof of knowledge to prove to a Verifier, on the basis of the group-associated public key, Signer's possession of the credential, and thus Issuer-attested group membership, without the identity of the Signer being revealed;

the Issuer, Signer, and Verifier each acting through a corresponding computing apparatus; the method further comprising, at intervals, the Issuer:

updating its private and public keys, effecting a complementary updating to the Signer's credential to take account of the updating of the Issuer's private key unless the Signer has ceased to be a legitimate group member, a non-updated credential being inadequate to enable the Signer to prove its Issuer attested group membership to a Verifier on the basis of the updated Issuer public key.

13. A cryptographic system comprising an Issuer computing apparatus, a Signer computing apparatus comprising, or associated with, a Signer, and a Verifier computing apparatus, wherein:

the Issuer computing apparatus, on the Signer being assessed as a currently legitimate member of a group associated with a public/private key pair of the Issuer computing apparatus, being arranged to use a disguised secret of the Signer computing apparatus and the group-associated private key to generate a credential, in the form of a signature on the secret of the Signer computing apparatus;

the Signer computing apparatus being arranged to store the credential as a secret and use a signature proof of knowledge to prove to the Verifier computing apparatus, on the basis of the group-associated public key, Signer's possession of the credential, and thus Issuer-attested group membership, without the identity of the Signer being revealed;

the Issuer computing apparatus being arranged to effect, at intervals, an updating of at least the public key of the public/private key pair associated with the group, and a complementary updating to the credential to take account of the updating of the group-associated key pair unless the Signer has ceased to be a legitimate group member; a non-updated credential being inadequate to enable the Signer to prove its attested group membership to the Verifier computing apparatus on the basis of the updated Issuer public key.

14. A cryptographic system according to claim 13, wherein the credential is a Camenisch-Lysyanskaya signature under the Lysyanskaya, Rivest, Sahai, and Wolf assumption, and the signing of the credential by the Signer computing apparatus provides a signature proof of knowledge in respect of at least the Signer's secret.

15. A cryptographic system according to claim 13, wherein the credential is a Camenisch-Lysyanskaya signature under the strong RSA assumption, and the signing of the credential by the Signer computing apparatus provides a signature proof of knowledge in respect of at least the Signer's secret.

* * * * *